United States Patent
Beene

[15] 3,675,950
[45] July 11, 1972

[54] ARTICLES OF MANUFACTURE INCLUDING CYLINDRICAL MEMBERS HAVING SPECIALLY-TERMINATED PROTECTIVE COATINGS

[72] Inventor: Calvin D. Beene, Houston, Tex.
[73] Assignee: Schlumberger Technology Corporation, New York, N.Y.
[22] Filed: Nov. 21, 1969
[21] Appl. No.: 878,722

Related U.S. Application Data

[62] Division of Ser. No. 691,522, Dec. 18, 1967, Pat. No. 3,535,136.

[52] U.S. Cl. .................................285/45, 85/1 C, 285/355
[51] Int. Cl. .................................................F16l 11/12
[58] Field of Search..................285/45, 46, 355, 47, 48, 49, 285/50, 51, 52, 53, 54, 55, 260, 5 F; 138/145; 85/1 C; 117/4

[56] References Cited

UNITED STATES PATENTS

| | | | |
|---|---|---|---|
| 2,646,822 | 7/1953 | Ferguson | 138/145 X |
| 3,136,651 | 6/1964 | Spessurd | 117/21 |
| 3,138,861 | 6/1964 | Gaido | 285/55 X |
| 3,434,900 | 3/1969 | Bender | 285/45 |

FOREIGN PATENTS OR APPLICATIONS

| | | | |
|---|---|---|---|
| 929,422 | 6/1963 | Great Britain | 285/45 |
| 93,697 | 3/1960 | Netherlands | 285/260 |

*Primary Examiner*—Dave W. Arola
*Attorney*—Ernest R. Archambeau, Jr., David L. Moseley, Edward M. Roney and William R. Sherman

[57] ABSTRACT

The particular embodiment described herein as illustrative of the present invention relates to articles of manufacture having particular portions that are selectively coated. More particularly, the present invention as disclosed herein is directed to articles of manufacture having selected cylindrical surfaces which are masked and, after being heated, are fusion coated by application thereto of pulverulent particles of a fusible thermoplastic or thermosetting coating material. After the article has been coated and the coating has at least firmed, the mask is removed in such a manner as to leave a well-defined marginal termination of the coating, with this termination being raised in relation to the surface of the adjacent portions of the coating to provide sealing engagement within a pliable complementary sleeve extending from other associated coated articles.

4 Claims, 5 Drawing Figures

3,675,950

Calvin D. Beene
INVENTOR

BY
ATTORNEY

ARTICLES OF MANUFACTURE INCLUDING CYLINDRICAL MEMBERS HAVING SPECIALLY-TERMINATED PROTECTIVE COATINGS

This application is a division of application Ser. No. 691,522, filed Dec. 18, 1967 now U.S. Pat. No. 3,535,136.

It is, of course, quite common to coat metal articles by heating the article to an elevated temperature and, by one of the fluidized coating techniques, applying a suitable pulverulent coating composition to those surfaces of the article that are to be coated. As the fluidized coating particles approach or contact these surfaces, the particles absorb heat from the article and are melted to form a continuous fused coating on the substrate surfaces. Where necessary, the coated articles are again heated to complete the fusion process and leave an effective protective coating on the substrate surfaces. There are, of course, many well-known techniques for applying such fluidized powdered coatings and conditioning the fused particles to obtain a desired coating and those skilled in the art are fully cognizant of the various ramifications involved to achieve a desired result.

It is, of course, recognized that a mask must be used to prevent such powdered coatings from being accepted by those portions of an article which must be heated but which are not to be coated. This poses somewhat of a problem where the mask is first engaged with the article to be coated and the mask and the article are then preheated together since the coating will cover both the article and the mask. This will make it necessary, therefore, to carefully cut the coating along the junction of the mask with the article to remove the mask. It will be appreciated that this usually requires a tedious manual operation that generally leaves an irregular surface at the termination of the coating on the finished article.

Irrespective of the application techniques used or the particular fusion-coating composition involved, no suitable procedure has yet been devised for masking the end portions of cylindrical or tubular members, such as pipe, conduit, and the like, so as to terminate the fused coating with a smooth and uniform surface after the mask has been removed. The problem is particularly evident where the masked portion of the cylindrical member is threaded. Moreover, where a cylindrical member with male threads is adapted for subsequent threaded engagement into another coated member having a projecting plastic sleeve that is arranged to snugly fit over the cylindrical member behind the male threads, the manner in which the coating on the cylindrical member is terminated becomes even more significant in determining whether a sealing engagement is effected between the interior of the pliable sleeve and exterior of the coating.

Accordingly, it is an object of the present invention to provide new and improved cylindrical or tubular members which are powder coated in such a manner that the terminal edge of the coating will be terminated in a smooth peripheral bead that will allow a tubular pliable sleeve projecting from an article that is attached to the tubular member to be distended slightly by the peripheral bead so as to more tightly seal the sleeve around the cylindrical member.

These and other objects of the present invention are attained by providing a tubular mask of a heat-conductive material and having a marginal severing edge, with this mask being adapted to complementally receive the end portion of a cylindrical or tubular article that is to be powder coated. Thus, after the cylindrical member has been coated and the coating has at least firmed, as the mask is removed, the marginal severing edge thereon will part the circumferential band of coating joining the mask to the cylindrical member to leave a smooth and uniform termination along the edge of the finished coating. By shaping the marginal severing edge of the mask in a particular manner, the termination of the coating will be in the form of a peripheral projection or bead encircling the cylindrical member. Thus, when the cylindrical member is coupled to another member having a resilient tubular sleeve projecting outwardly therefrom, the sleeve will be snugly fitted over the cylindrical member and the peripheral bead.

The novel features of the present invention are set forth with particularity in the appended claims. The operation, together with further objects and advantages thereof, may best be understood by way of illustration and example of a preferred embodiment when taken in conjunction with the accompanying drawings, in which:

Figure 1:
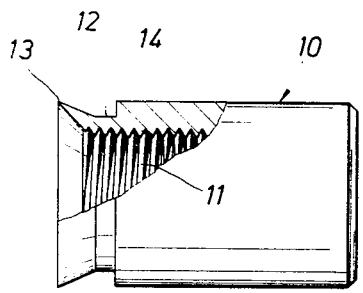
FIG. 1 depicts a mask arranged for providing coated articles in accordance with the principles of the present invention.

Turning now to FIG. 1, a tubular mask 10 is shown there as a preferred embodiment for manufacturing the articles of the present invention (not shown in FIG. 1) which are to be coated by one of the typical fluidized or powder-coating techniques. In general, the tubular mask 10 is formed of a rigid, heat-conductive material, such as a metal, a ceramic, or a glass-like material, that is capable of being heated to elevated temperatures. The tubular mask 10 has an internal bore sized to complementally receive the end portion of the cylindrical or tubular member. Thus, where a cylindrical or tubular article of the present invention has an externally-threaded end, the mask 10 is preferably provided with complemental internal threads 11 adapted to threadingly engage those on the member to be coated.

Severing means, such as an integral outwardly-converging peripheral projection 12, are provided on the end of mask 10 that is to be fitted over a cylindrical or tubular member to be coated. It will be noted that the peripheral projection 12 is appropriately tapered so as to terminate in a thin, if not somewhat sharp, circumferential edge, as at 13, encircling a cylindrical or tubular member coupled to the mask 10.

For reasons that will subsequently become apparent, the peripheral projection 12 is formed so as to have a minimal mass in relation to the remainder of the mask 10. To accomplish this, the projection 12 is formed with the tapered cross-section as illustrated and a portion of the mask 10 adjacent thereto is cut-away as by forming an external circumferential groove 14 around the body of the mask. In this manner, the mass of the material comprising the peripheral projection 12 is substantially less than the mass of the body or major portion of the mask 10.

It will be realized, of course, that means must be provided to close the end of the mask 10 on the opposite end thereof from the peripheral projection 12 in some convenient manner so as to block entrance of the powdered coating composition. Similarly, means may also be included to facilitate handling of the cylindrical or tubular member once the mask 10 is secured thereon. Since the arrangement of such closure means and handling means will depend upon the particular circumstances and such arrangements are readily apparent to those skilled in the art, FIG. 1 does not illustrate any particular arrangement. Thus, the opposite end of the body of the mask 10 may be blocked with either an integral or a removable closure and a suitable hook or the like may also be provided as desired where, for example, the tubular member to be coated is to be immersed in a so-called fluidized bed of powdered coating material. Such closure or handling means are, of course, of no particular significance to the present invention.

Figure 2:
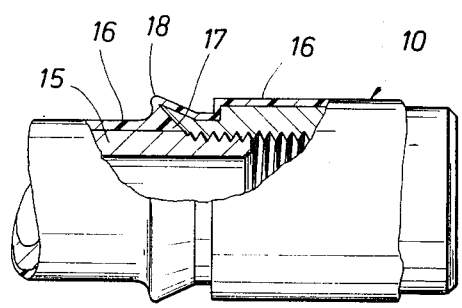
FIG. 2 shows the mask of FIG. 1 being used to coat the external surfaces of a tubular article of the present invention.

Turning now to FIG. 2, the mask 10 is shown threadingly engaged onto one end of a tubular member 15 that has been powder-coated, as at 16. It will be appreciated, of course, that the mask 10 was coupled to the tubular member 15 before the members were coated. Once the mask 10 and tubular member 15 were coupled, they were heated in some convenient manner to a selected temperature above the sintering or melting temperature of whatever thermoplastic or thermosetting pulverulent composition is to be applied to achieve the coating 16. Similarly, it will be appreciated that the surfaces of the tubular member 15 to be coated were previously prepared as required to obtain an adequate bonding of the coating 16 as the pulverulent coating particles are coalesced by the heat given up by the mask 10 and tubular member. Inasmuch as the particular techniques required to obtain a satisfactory coating 16 are well understood by those skilled in the art of powder coatings and these details are only incidental to an understanding of the present invention, it is believed sufficient to say only that the coating 16 is a powder coating that has been applied to the properly prepared surfaces by any one of the typical powder-coating techniques.

It will be noted in FIG. 2 that the coating 16 has a substantially uniform thickness except in the proximity of the peripheral projection 12. In one instance of such non-uniformity, the portion of the coating 16 partially received, as at 17, within the annulus defined between the inner face of the peripheral projection 12 and the exterior of the tubular member 15 has been built-up to a greater thickness than the other portions of the coating. In the other instance, the portion of the coating 16 immediately overlaying the thin or sharpened edge 13 of the peripheral projection 12 is substantially thinner, as at 18, than any other portion of the coating. It is the essence of the invention, therefore, to obtain at least the enlarged-diameter portion 17 and, preferably, the thin portion 18 as well.

It will be recognized, therefore, that it is the particular configuration of the peripheral projection 12 on the mask 10 that is responsible for the two discrepant coating portions 17 and 18. Those skilled in the art will, of course, recognize that, all else being equal, the thickness of a given powder coating that will be built-up on a heated member will be significantly controlled by the amount of heat released at a given point on the article being coated. Thus, in the first instance, the enlarged-diameter coating portion 17 is attributed to the release of heat from the adjacent surfaces of both the peripheral projection 12 and the tubular member that will coalesce the pulverulent coating particles in this annular but well-opened recess during the coating process. By facing two heat-releasing surfaces such as these on opposite sides of the annular recess defined therebetween, a coating will be built-up on each surface that will quickly approach and then merge with the other. Thus, by the time that the coating application is discontinued (whether by cooling of the members 10 and 15 or by removal of the members from further contact with the still-pulverulent particles of the coating composition), the coatings on each of these facing surfaces will have built-up and come together to form the integral enlarged-diameter coating portion 17.

The action described above in regard to forming the enlarged-diameter coating portion 17 is, at least in part, also responsible for formation of the fairly thin coating portion 18 since this will reduce the quantity of transferable heat that is available for forming a coating right along the sharp edge 13 of the projection 12. Moreover, in any event as, for example, where a projection is directed radially outwardly, the tapered cross-section of the projection will so reduce the mass of heat-retaining material immediately adjacent to the outer edge that only a relatively-thin layer of coating can be formed before insufficient heat is left in the projection to coalesce additional pulverulent particles of the coating composition. Thus, the tapered projection 12 will also assure that the coating portion 18 is relatively thinner than any other portion of the coating 16.

Figure 3:
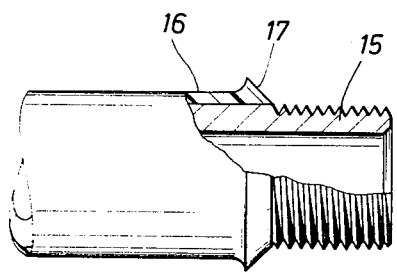
FIG. 3 shows the tubular member of FIG. 2 after the mask of FIG. 1 has been removed.

Once the coating 16 has cooled sufficiently to be at least firm, the mask 10 is simply rotatably disengaged from the tubular member 15. As it is removed, the mask 10 is twisted or rotated so that the sharp edge 13 will be effective to part the coating along the thin encircling portion 18 and leave the enlarged-diameter projection portion 17 undisturbed as shown in FIG. 3.

Figure 4:
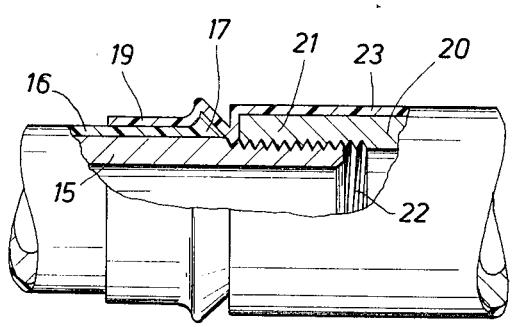
FIG. 4 illustrates a typical fitting or the like coupled to the coated tubular member of FIG. 3.

The significance of the enlarged-diameter coating bead 17 remaining after the mask 10 is removed is best understood when FIG. 4 is considered. It has been customary in some instances to coat tubular fittings and other articles to which a coated tubular member, such as a pipe or conduit, is to be connected. Accordingly, as shown in FIG. 4, to provide somewhat of a seal between such coated tubular members and their associated fittings or other articles, it has previously been found desirable to form an outwardly-projecting pliable sleeve 19 around each of the sockets and the like on a fixture, fitting or such, as at 20, with these sleeves supposedly being adapted to snugly receive a coated member when it is connected to the fitting.

For example, where the fitting 20 is a typical coupling, elbow, tee, connection box, or an electrical fixture having a socket 21 with female threads 22 therein, the pliable sleeve 19 extending therefrom will be formed to have an internal diameter that is only slightly larger than the anticipated external diameter of the coated tubular member, as at 15, that is to be ultimately received by the socket. In one typical manner of forming such a pliable sleeve 19, a metallic cylindrical extension (not shown) of suitable dimensions is temporarily disposed in each of the sockets 21 and the outer exposed surfaces of these extensions are prepared (as by either coating them with a non-sticking compound or — depending upon the powder composition used — by not priming their exposed surfaces) so that the powder coating will not adhere to the extensions when they and the fitting 20 are powder coated. Thus, when the fitting 20 and the various extensions thereon are preheated and the pulverulent coating powders brought into contact therewith, a coating 23 will be developed on the fitting that will also extend without interruption over the temporary extensions. It will be appreciated, therefore, that the coating 23 will be bonded to the fitting 20 but that the extended portions thereof on the temporary extensions will not be adhered to the extensions so that pliable sleeves, as at 19, will be formed after the extensions are removed. This technique is familiar to those skilled in the powder-coating art and further elaboration is believed unnecessary.

It has, however, been a problem heretofore to obtain a snug sealing engagement between the inner surfaces of such pliable sleeves, as at 19, and the external surfaces of the coating on those tubular members that have been powder coated in the usual manner. For example, before the present invention, if the coating on the tubular member was either too thick or too thin, the pliable sleeves, as at 19, would either not slip easily over the coated tubular member being inserted or else would be so loose that little or no seal was effected.

The present invention will, however, insure that a tight seal is effected by the pliable sleeves as at 19. As shown in FIG. 4, the enlarged-diameter termination 17 of the coating 16 will serve two functions in providing a tight seal between the pliable sleeve 19 and the coating on the tubular member 15. First of all, as the tubular member 15 of the present invention is being coupled to the fitting 20, the tapered forward face of the peripheral bead 17 will be effective to slightly expand the mouth of the pliable sleeve 19 and allow it to slip easily on over the coating 16. Then, once the tubular member 15 is fully coupled to the socket 21, the peripheral bead 17 will be snugly fitted within the pliable sleeve 19 to effect a sealing engagement irrespective of the fit between the forward portion of the sleeve and the coating 16.

It will be appreciated that, within the range of practical limits of typical quality control techniques that may be used in large-scale production, the dimensions of the tapered projection 12 of the mask 10 will establish a substantially constant height for the enlarged-diameter head 17 even though the thickness of the coating 16 may vary considerably from one tubular member 15 to another. This close dimensional control is, of course, assured since both the outer diameter of the peripheral bead 17 and the internal diameter of the pliable sleeve 19 are respectively determined by the corresponding dimension of the heat-releasing surfaces used to form the bead and sleeve. Since these corresponding dimensions are relatively unvarying, the degree of fit between the sleeves 19 and the peripheral beads 17 will be fairly uniform. Thus, it will no longer be necessary as heretofore to hand-pick matching fixtures and conduits to achieve a reasonable seal. It will be recognized that the only other practical alternate heretofore has been to use an adhesive to bond a loose-fitting sleeve to a coated member therein. This, of course, makes it necessary to destroy the coating and sleeve if the coated member is subsequently removed. It will be appreciated, therefore, that the present invention has now for the first time made mass-production of coated tubular members and their associated fixtures and fittings practically feasible. Moreover, the present invention now permits such members to be removed as needed without damage to either the coating or the pliable sleeve.

Figure 5:
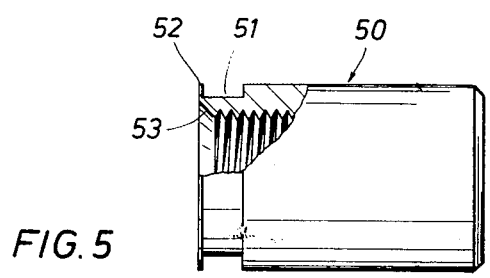
FIG. 5 depicts an alternative embodiment of a mask for providing coated articles in accordance with the principles of the present invention.

Turning now to FIG. 5, an alternate embodiment is shown of a mask 50 which can also be employed to manufacture coated tubular members in accordance with the present invention. As seen there, the mask 50 is formed with a circumferential groove 51 around one end thereof for defining a thin, peripheral projection 52 of reduced mass, with this projection extending radially outwardly instead of being inclined as is done with the mask 10. As a result of the radial extension of the thin projection 52, only a tapered recess 53 of limited dimensions can be coaxially formed within the end of the mask 50. Although this coaxial recess 53 is smaller than the corresponding recess in the mask 10, the resulting peripheral enlargement (such as at 17 in FIG. 3) formed on a coated tubular member will still be of sufficient diameter to provide a satisfactory sealing fit within a complementary sleeve (such as at 19 in FIG. 4).

Accordingly, by employing the principles of the present invention, powder coatings can now be formed on the external surfaces of cylindrical members in such a manner that the coating is smoothly and uniformly terminated along its exposed edges. By masking portions of the external surfaces of cylindrical members to be powder coated as described above, a smoothly terminated projection or bead of the coating material is formed around the coated members of the present invention to insure a snug fit of an enveloping pliable sleeve projecting from another coated member that is to be disposed over the first coated member when the two members are coupled. It will be appreciated, therefore, that the present invention provides new and improved cylindrical or tubular articles having selected areas coated and terminated for providing cooperatively-arranged sealing surfaces adapted to effect snug seals with complementally-fitting pliable extensions from associated articles.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Articles of manufacture comprising: a first tubular member of a heat-conductive material having a circular socket defined in one end thereof, a first coalesced plastic coating having one portion bonded to the exterior of said first tubular member and a free portion coaxially disposed around said circular socket and extending longitudinally therebeyond for defining an extended pliable sleeve having a relaxed inner diameter of a first dimension and an expanded inner diameter of a second larger dimension; a second tubular member of a heat-conductive material having a cylindrical terminal portion coaxially received in said pliable sleeve with the end of said terminal portion complementally fitted into said socket for joining said tubular members, a second coalesced plastic coating bonded to the exterior of said second tubular member and co-operatively terminated on said terminal portion at a position between the free end of said pliable sleeve and said socket for defining a radially-directed outwardly-projecting peripheral protrusion having a conically-tapered forward surface for progressively expanding said pliable sleeve radially outwardly from its said first dimension as said terminal portion of said second tubular member is inserted through said pliable sleeve and its said end is fitted into said socket to join said tubular members, said peripheral protrusion having an outer diameter of about said second dimension for effecting sealing engagement between the exterior surface of said peripheral protrusion and the inner surface of said expanded pliable sleeve when said tubular members are joined; and means for securing said end of said terminal portion of said second tubular member within said socket of said first tubular member.

2. The articles of claim 1 wherein said securing means are internal threads in said socket and external threads on said terminal portion of said second tubular member ahead of said peripheral protrusion.

3. The articles of claim 1 wherein at least one of said first and second plastic coatings is a thermosetting composition.

4. The articles of claim 1 wherein at least one of said first and second plastic coatings is a thermoplastic composition.

* * * * *